Patented Feb. 14, 1950

2,497,246

UNITED STATES PATENT OFFICE 2,497,246

AZO DYES

William Henry von Glahn, Loudenville, N. Y., assignor to General Aniline & Film Corporation, New York, N. Y., a corporation of Delaware No Drawing. Application April 2, 1946, Serial No. 659,161

1 Claim. (Cl. 260—186)

This invention relates to a new class of water insoluble azo dyes. More particularly it relates to azo dyes of the general formula:

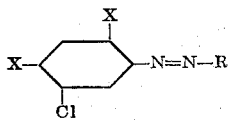

In this formula R stands for the radical of an aromatic compound containing an azo group and the X's stand for radicals of the group consisting of methoxy and ethoxy radicals.

These new dyestuffs which can be made in substance or on the fiber have high tinctorial values and exceptional fastness properties. They are obtained by coupling the diazo compound of an amine of the general formula:

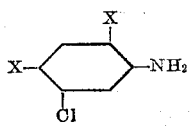

wherein the X's are alkoxy radicals of the group consisting of methoxy and ethoxy groups with an azo compound capable of further coupling and free of water solubilizing groups, such as SO3H and COOH groups. In the production of the dyestuff in substance as a pigment, the 5-chloro-2.4-dialkoxy aniline is diazotized in the usual manner and after clarification of the diazo solution it is added to a buffered alkaline solution of the azo coupling component. When coupling is complete, the reaction solution is acidified and filtered. The resulting pigment is then washed acid free and dried. For the development of the color on the fibers, textiles of natural or regenerated cellulose or animal fibers may be employed. Of particular interest are cotton and cellulose acetate fibers. Any of the usual ice color processes may be used in the development of the color. One such process is as follows: a printing paste is prepared by mixing a diazo amino compound derived by condensing the diazo of 5-chloro-2.4-dialkoxy aniline with an amino compound, such as sarcosine, methyl taurine, 2-amino-5-sulfobenzoic acid, proline, N-methylglucamine or other amino compound known to be suitable for such purpose with a coupling component which is an azo compound capable of further coupling and being free from water solubilizing groups. To this mixture is added sodium hydroxide, Cellosolve, a thickening agent such as starch or gum tragacanth, and water. If desired, such other textile assistants as Turkey red oil, dispersing agents and solvents may also be added. The fabric is printed by application of the paste in the desired design, drying and introducing the treated fabric to an ager where it is subjected for a short time to the action of steam containing the vapors of volatile organic acid or acids, such as formic and acetic acids. As is well known in this type of printing, the acid in the vapor splits the amine stabilizer from its combination with the diazo compound and permits the latter to couple with the azo dye coupling component present in the printing paste. The design is thus developed in the color of the azo dye resulting from the coupling reaction. The fabric is then rinsed, washed and dried. Alternative methods of development may be employed, such as introducing the printed fabric to a bath containing an acid, such as formic acid, acetic acid or oxalic acid, which bath may also contain other assistants and penetrants.

A representative number of azo dyes capable of further coupling is given in the detailed examples below which are intended to be illustrative of the best manner of performing the invention and not as limitations on its scope. In addition to the coupling directive groups, the molecule of the azo dye coupling component may carry any of the usual substituents employed in dye components for enhancement of the dye properties, such as alkyl, alkoxy, nitro and halogen groups, or it may be otherwise unsubstituted. Unless otherwise stated, the parts are by weight.

EXAMPLE 1

*Preparation of a pigment*

18.75 grams of 5-chloro-2.4-dimethoxy aniline are dissolved in
100 grams of water and
23 cc. of 21° Bé. hydrochloric acid.

Cool this solution to —5° C. and add a solution of sodium nitrite containing 6.9 grams of 100% sodium nitrite for diazotization; when diazotized, add diatomaceous earth and clarify. Add the diazo solution thus obtained to a buffered alkaline solution of 31 grams of 4-(o-nitrobenzeneazo)-1-amino-7-naphthol.

Agitate until coupling is complete.

Acidify with hydrochloric acid, filter, wash acid free and dry. The dyestuffs obtained is a black pigment of high tinctorial value having the chemical formula:

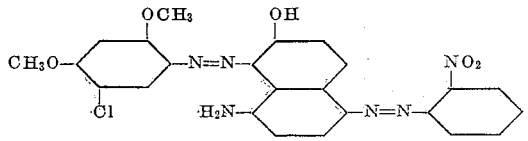

EXAMPLE 2

A printing paste is prepared by mixing 2.9 parts of the disodium salt of the diazo amino compound obtained by condensing the diazo of 5-chloro-2.4-dimethoxy aniline obtained in accordance with the procedure of Example 1 with 2-amino-5-sulfobenzoic acid
1.9 parts of the coupling component obtained by acid combination of o-nitraniline diazo with 1.7-aminonaphthol
4.0 parts of Cellosolve
24.0 parts of water
3.0 parts of sodium hydroxide solution 30%
65.0 parts of gum tragacanth.

Cotton and rayon piece goods were printed on an engraved roller with this printing paste. The printed material was dried and then treated for a short time with live steam containing the vapors of acetic acid. The developed prints were then soaped for five minutes in boiling ½% soap solution, rinsed in clear water and dried. A rich deep black shade having good fastness properties was obtained. The dyestuff has the same formula as the dyestuff of Example 1.

EXAMPLE 3

*Preparation of a pigment*

The diazo of 5-chloro-2.4-dimethoxy aniline is prepared in the same manner as in Example 1. The diazo solution obtained is added to a buffered alkaline solution containing 28 grams of 4-(5'-chloro-2'-methoxybenzeneazo)resorcinol. The coupling solution is agitated for several hours or until coupling is complete. It is then acidified with hydrochloric acid, filtered, washed acid free and dried. The dyestuff obtained is a brown pigment having high tinctorial value and good fastness properties. Its chemical formula is:

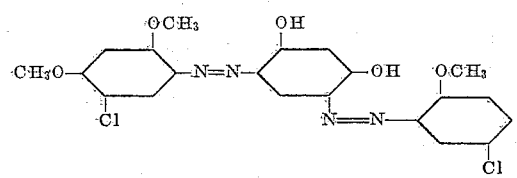

EXAMPLE 4

A diazo solution of 5-chloro-2.4-dimethoxy aniline is prepared as in Example 1. Add this diazo solution to a buffered alkaline solution of 26.5 grams of 4-(4'-chloro-2'-hydroxybenzeneazo)resorcinol. Agitate this solution for several hours or until coupling is complete. Acidify with hydrochloric acid, filter, wash acid free and dry. The dyestuff obtained is a brown pigment having high tinctorial value and good fastness properties. Its chemical formula is:

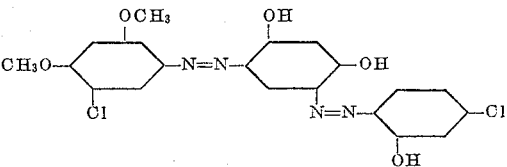

EXAMPLE 5

Prepare a diazo solution of 5-chloro-2.4-dimethoxy aniline as in Example 1. Add this diazo solution to a buffered alkaline solution of 31.3 grams of 1-(5'-chloro-2'-methylphenylazo)-2.3-dihydroxynaphthalene. Agitate until coupling is complete. Acidify with hydrochloric acid, filter, wash acid free and dry. The dyestuff obtained is a neutral black pigment of excellent tinctorial value having the formula:

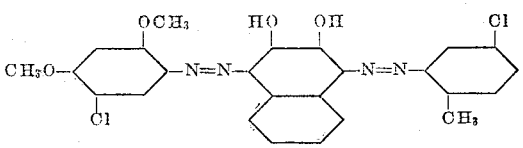

EXAMPLE 6

Prepare a diazo solution of 5-chloro-2.4-dimethoxy aniline as in Example 1. Add this diazo solution to a buffered alkaline solution containing 29.7 grams of α-napthylazo orcinol. Agitate until coupling is complete. Acidify with hydrochloric acid, filter, wash acid free and dry. The dyestuff obtained is a bright brown pigment of excellent tinctorial properties having the formula:

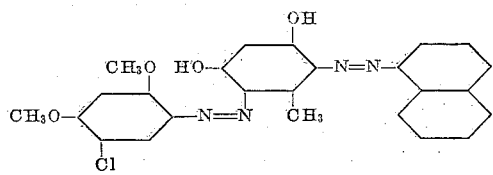

EXAMPLE 7

Dissolve 22 grams of 5-chloro-2.4-diethoxy aniline in
100 grams of water and
23 cc. of 21° Bé. hydrochloric acid.

Cool to —5° C. and add a solution of sodium nitrite containing 6.9 grams 100% sodium nitrite for diazotization. When diazotized, add diatomaceous earth and clarify.

Add the diazo solution thus obtained to a buffered alkaline solution of 31 grams of 4-(o-nitrobenzeneazo)-1-amino-7-naphthol. Agitate until coupling is complete. Acidify with hydrochloric acid, filter, wash acid free and dry. The dyestuff obtained is a black pigment of high tinctorial value having the chemical formula:

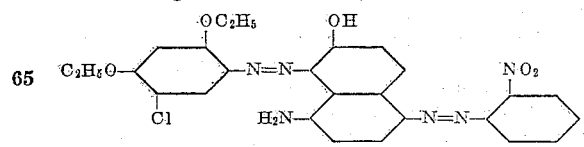

EXAMPLE 8

Dissolve 20.4 grams of 5-chloro-2-ethoxy-4-methoxy aniline in
100 grams of water and
23 cc. of 21° Bé. hydrochloric acid.

Cool this solution to —5° C. and add for diazotization a solution of sodium nitrite containing 6.9 grams of 100% sodium nitrite. When diazotized, add diatomaceous earth and clarify. Add this diazo solution to a buffered alkaline solution of 28 grams of 4-(5'-chloro-2'-methoxybenzeneazo)resorcinol. Agitate until coupling is complete. Acidify with hydrochloric acid, filter, wash acid free and dry. The dyestuff obtained is a brown pigment having high tinctorial value and good fastness properties. Its chemical formula is:

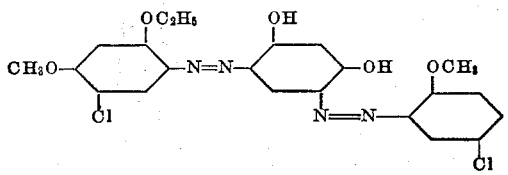

The dyes of this application can be metallized either in substance or on the fiber by any of the usual methods, if it is desired to produce the metal complexes of the dyes such as the chrome, copper or cobalt complexes.

From the foregoing description and illustrative examples, it will be apparent to those skilled in the art that many and various embodiments of the invention may be made without departing from the spirit and scope thereof. It is to be understood that no limitations are intended except as defined in the following claim or as imposed by the prior art.

I claim:

The azo dye compound represented by the formula

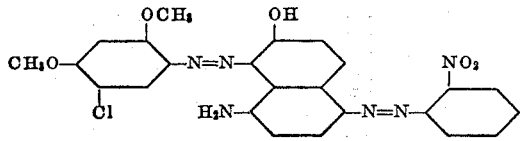

WILLIAM HENRY von GLAHN.

REFERENCES CITED

The following references are of record in the file of this patent:

UNITED STATES PATENTS

| Number | Name | Date |
|---|---|---|
| 1,872,033 | Grether | Aug. 16, 1932 |
| 1,915,430 | Laska | June 27, 1933 |
| 2,093,402 | Dahlen | Sept. 21, 1937 |
| 2,135,964 | Dahlen | Nov. 8, 1938 |
| 2,230,099 | Zwilgmeyer | Jan. 28, 1941 |

OTHER REFERENCES

Friedlander, vol. 6, pages 1297 and 1298, Berlin 1904.